United States Patent
Jong et al.

(10) Patent No.: US 9,334,973 B2
(45) Date of Patent: May 10, 2016

(54) TRIM OF CHECK VALVE

(71) Applicant: FUSAN VALVE (SUZHOU) LIMITED, Suzhou, Jiangsu Province (CN)

(72) Inventors: Lian-Tsai Jong, Suzhou (CN); Wen-Lung Chung, Suzhou (CN); Shen-Kai Chung, Suzhou (CN); Ji-Hui Jia, Suzhou (CN)

(73) Assignee: FUSAN VALVE (SUZHOU) LIMITED, Suzhou, Jiangsu Province (CN)

( * ) Notice: Subject to any disclaimer, the term of this patent is extended or adjusted under 35 U.S.C. 154(b) by 277 days.

(21) Appl. No.: 14/063,696

(22) Filed: Oct. 25, 2013

(65) Prior Publication Data

US 2014/0345717 A1  Nov. 27, 2014

(30) Foreign Application Priority Data

May 21, 2013  (CN) .......................... 2013 1 0188834

(51) Int. Cl.
  *F16K 15/06*  (2006.01)
  *F16K 15/18*  (2006.01)
  *F16K 3/08*   (2006.01)

(52) U.S. Cl.
  CPC ................. *F16K 15/18* (2013.01); *F16K 3/085* (2013.01); *Y10T 137/7904* (2015.04)

(58) Field of Classification Search
  CPC .. Y10T 137/7904; F16K 15/063; F16K 3/085
  USPC ............................................ 137/512.1, 614.2
  See application file for complete search history.

(56) References Cited

U.S. PATENT DOCUMENTS

| 7,093,610 | B2 | 8/2006 | Wu |
| 7,686,028 | B2 | 3/2010 | Wu |
| 7,975,720 | B2 * | 7/2011 | Conway ................. E03B 9/025 137/283 |
| 8,079,382 | B2 | 12/2011 | Wu |
| 8,402,991 | B2 | 3/2013 | Wu |
| 2007/0018130 | A1 | 1/2007 | Wu |
| 2011/0114865 | A1 | 5/2011 | Wu |
| 2012/0085427 | A1 | 4/2012 | Wu |

FOREIGN PATENT DOCUMENTS

CN  2520442  11/2002

* cited by examiner

*Primary Examiner* — Kevin Lee
*Assistant Examiner* — P. Macade Nichols
(74) *Attorney, Agent, or Firm* — Muncy, Geissler, Olds & Lowe PC

(57) ABSTRACT

A trim of a check valve includes a stem, a fixed member including two opposite through holes, a rotational member secured to the stem and including two opposite recesses, a hollow coupling member including an inlet at one end, a sleeve releasably secured to the coupling member wherein the sleeve includes an outlet at an other end and the fixed member and the rotational member are disposed at one end of the sleeve, a closing member moveably disposed at an other end of the sleeve, a connector releasably secured to an other end of the stem, and a biasing member biased between the closing member and the connector. In response to fluid pressure differential greater than a predetermined value the rotational member is clockwise turned to align the through holes with the recesses to allow the fluid to flow out of the outlet.

10 Claims, 2 Drawing Sheets

TRIM OF CHECK VALVE

BACKGROUND OF THE INVENTION

1. Field of the Invention

The invention relates to check valves and more particularly to an improved trim of a check valve.

2. Description of Related Art

Valve is a device that regulates, directs or controls the flow of a fluid by opening, closing, or partially obstructing various passageways. Valves have many uses, including controlling water for Irrigation, industrial uses for controlling processes, water and sewage processing, mining, power generation, processing of oil, gas and petroleum, food manufacturing, chemical and plastic manufacturing, military and transport sectors, and many other fields.

Check valves are two-port valves, meaning they have two openings in the body, one for fluid to enter and the other for fluid to leave. There are various types of check valves used in a wide variety of applications. Although they are available in a wide range of sizes and costs, check valves generally are very small, simple, and/or inexpensive. Check valves work automatically and most are not controlled by a person or any external control. However, many typically the check valves have the drawbacks of being stuck, compromised leak-tight seat, large sediment accumulation, etc.

China Utility Model No. 01276666.6 granted in 2002 discloses a check valve having a double trim as detailed below. A stem 3 is able to move in a guide sleeve 1. A double trim 5 is connected to a front portion. The double trim 5 has a sealing ring on each of a plurality of layers. A spring 4 is put on the double trim 5 so that a turning of the stem 3 can move further into an outlet for blocking a reverser flow in cooperation with a wedge shaped structure and the sealing rings. However, the guide sleeve 1 is relatively elongated so that a traveling distance of the stem 3 is long. Further, sediment accumulated on an inner surface of the guide sleeve 1 can hinder the movement of the stem 3. After a long period time of use, the stem 3 may be stuck in the guide sleeve 1 with the desired leak-proof function compromised. Furthermore, the elongated stem 3 may be bent due to long time collision with fluid flow. The bent stem 3 also may be easily stuck. In addition, the double trim 5 has it leak-proof function being implemented by tightly compressing the sealing rings onto the outlet. However, the sealing by the sealing rings may be compromised after a period time of use due to the nature of the plastic sealing rings or due to excessive high pressure of fluid flow. Additionally, the valve is relatively large due many parts such as the stem 3, the guide sleeve 1, a handle 10, etc. And in turn, it can limit its applications and adversely increase the manufacturing cost.

U.S. Pat. No. 8,402,991 to Wu discloses an outlet valve for a frost-preventing faucet employing an axial slot at a central top inside the inlet passage for being inserted by an spring and an axial post. A first stop ring is disposed around the stop valve. The first stop ring and the stop valve are inserted into a limiting slot of a stop sleeve under the stop valve. A second stop ring around the stop sleeve is inserted into a lower section of an inner wall of the inlet passage. A bottom of the second stop ring is disposed above the top porcelain. Cooperating the subject configuration with the top porcelain allows the water to be supplied upward since outlet gates of the bottom porcelain and the top porcelain stay abreast without blockage. When a water pressure is greater than a restoring force of the spring, the stop valve upwardly compresses the spring. Thereby, water flows through the inlet passage at a middle portion of the plug and enters into an outlet at a top end of the tubular valve seat. The water is further upwardly guided into a supplying pipe of the faucet. When the water pressure is less than the restoring force of the spring, the spring compresses the stop valve. Thereby, an axial post of the stop valve is downwardly inserted into the limiting slot of the stop sleeve to stop the water flow. Thus the porcelain valve unit is prevented from freezing, and the water pressure is capable of controlling the water flow.

Notwithstanding the prior art, the invention is neither taught nor rendered obvious thereby.

SUMMARY OF THE INVENTION

It is therefore one object of the invention to provide a trim of a check valve for overcoming above drawbacks associated with the conventional check valve.

For achieving above and other objects, the invention provides a trim of a check valve comprising a stem; a fixed member including two opposite through holes; a rotational member secured to one end of the stem and including two opposite recesses, the rotational member being coaxially with the fixed member and capable of turning about the fixed member; a hollow coupling member including an inlet at one end; a sleeve having one end releasably secured to an other end of the coupling member wherein the sleeve includes an outlet at an other end and both the fixed member and the rotational member are disposed in a position proximate to one end of the sleeve; a closing member moveably disposed at an other end of the sleeve; a connector releasably secured to an other end of the stem; and a biasing member biased between the closing member and the connector; wherein the stem is disposed in the sleeve, the closing member, and the connector; wherein the outlet is blocked by the closing member either when there is no fluid flow or when a pressure differential between pressure at the inlet and pressure at the outlet is less than a predetermined value; and wherein in response to the pressure differential greater than the predetermined value the rotational member is turned in a first direction by a fluid flowing through the inlet to align the through holes with the recesses to allow the fluid to further flow through a space between the sleeve and the stem to push the closing member away from the sleeve with the biasing member being compressed, thereby flowing the fluid out of the outlet.

Preferably, further comprises a washer secured to an end of the closing member and urged against the other end of the sleeve for blocking the outlet.

Preferably, the closing member comprises a peripheral opening for discharging fouling.

Preferably, the stem comprises a perimetric opening for discharging fouling.

Preferably, the biasing member has a substantial portion put on the closing member.

Preferably, the outlet is in proximity to the closing member.

Preferably, the coupling member is threadedly secured to the sleeve, the inlet is disposed at one end of the coupling member, and the outlet is disposed at the other end of the sleeve.

Preferably, the outlet is a multiple outlet arranged along an edge.

Preferably, the stem is partially disposed in the sleeve and extends out of one end of the sleeve to pass through the closing member into the connector.

Preferably, in response to a weak fluid flow or no fluid flow, the rotational member is turned in a second direction opposing the second direction to misalign the through holes with the recesses, thereby blocking fluid from flowing through the through holes and the recesses.

By utilizing the trim of the check valve of the invention, the following advantages and benefits are obtained:

1. The stem is disposed in both the sleeve and the closing member when the valve is closed. Further, a distance between the disengaged closing member and the sleeve is equal to a length of the expanded spring minus a length of the compressed spring. Such short distance ensures a reduced probability of being stuck.

2. The sliding of the closing member on the stem during opening or closing of the valve can remove fouling formed on the stem. Thus, operation of the valve is more reliable and has a prolonged useful life.

3. The stem is partially disposed in an axial channel of the sleeve and extends out of one end of the sleeve. A washer and two o-rings are put on the stem adjacent to the projections for sealing purposes within the sleeve. This arrangement implements a compact design with lesser components and thus can greatly decrease the manufacturing cost.

4. A hollow connector is engaged with the other end of the closing member when a helical spring is put on both the connector and the closing member and disposed therebetween. The expanded spring creates a leak-tight connection between the washer and the sleeve when no fluid or insufficient fluid flows from the coupling member. Also, the opposite recesses do not align with the through holes. As a result, a reverse flow is blocked. In response to fluid having a sufficient pressure flows through the coupling member, the strong fluid can clockwise rotate the rotational member and the stem to align the through holes with the recesses. Thus, the fluid path through sleeve is open. Further, the strong fluid can push the washer away from the sleeve by compressing the spring. As a result, the fluid flows out of the outlet. To the contrary, in response to a weak fluid flow or no fluid flow, the rotational member counterclockwise rotates and also the stem to misalign the through holes with the recesses. Thus, the fluid path through sleeve is closed and the spring is expanded to push the washer against the other end of the sleeve. As a result, the outlet is blocked. This arrangement is reliable without being worried of being stuck and the check valve has a prolonged useful time.

The above and other objects, features and advantages of the invention will become apparent from the following detailed description taken with the accompanying drawings.

DETAILED DESCRIPTION OF THE INVENTION

Figure 1:
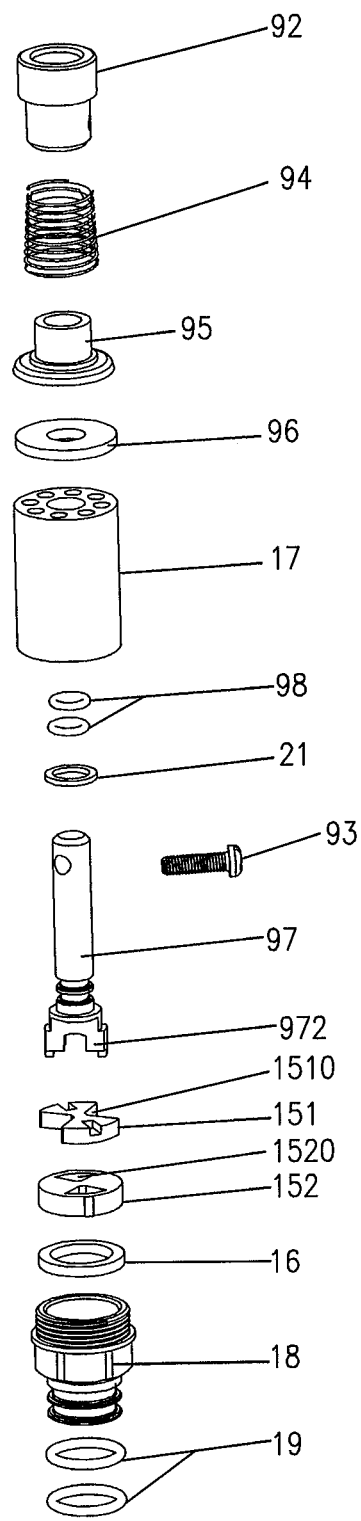
FIG. 1 is an exploded view of a trim of a check valve according to a first preferred embodiment of the invention.

Referring to FIGS. 1 to 6, a trim of a check valve in accordance with a first preferred embodiment of the invention comprises the following components as discussed in detail below.

A stem 97, a rotational member 151, and a disc shaped fixed member 152 having two through holes 1520 and coaxially with the rotational member 151 are provided. The rotational member 151 has two opposite recesses 1510 corresponding to the through holes of the fixed member 152 and two opposite cuts corresponding to the stem 97. Thus, a 90-degree turning of the stem 97 can either open or close the valve. The 90-degree turning is much less than the 180-degree or even 360-degree turning of the conventional stem in opening or closing the valve. For example, a 90-degree turning of the stem 97 can open the valve by creating a flow path through the fixed member 152, the rotational member 151, and the stem 97, and a subsequent 90-degree turning of the stem 97 can close the valve by blocking the flow path.

An externally threaded, hollow coupling member 18 is threaded secured to an internally threaded end of a sleeve 17 for fluid communication through both. The coupling member 18 comprises an inlet 26 at one end distal its externally threaded end. The sleeve 17 comprises an outlet 27 at the other end distal the internally threaded end thereof. Two O-rings 19 are tightly put on the inlet 26 for sealing purposes. Both the rotational member 151 and the fixed member 152 are fastened in the sleeve 1 with a washer 16 clamped between the fixed member 152 and the coupling member 18. The stem 97 comprises two opposite projections 972 at one end inserted into the two cuts of the rotational member 151 for joining the stem 97 and the rotational member 151 together. Thus, the stem 97 and the rotational member 151 can co-rotate. The sleeve 17 has a shoulder on an inner surface for limiting a turning angle of the stem 97 and thus the rotational member 151.

A closing member 95 is further provided. The stem 97 is partially disposed in an axial channel of the sleeve 17 and extends out of one end of the sleeve 17. A washer 21 and two o-rings 98 are put on the stem 97 adjacent to the projections 972 for sealing purposes within the sleeve 17. The outlet 27 is a multiple outlet around a portion of the channel of the sleeve 17. A washer 96 is secured to an end of the closing member 95 facing the sleeve 17. A hollow connector 92 is engaged with the other end of the closing member 95 when a helical spring 94 is put on both the connector 92 and the closing member 95 and disposed therebetween. A fastener 93 is driven through the connector 92 to secure to the other end of the stem 97 which is inserted through the washer 96 and the closing member 95 into a portion of the connector 92.

Figure 2:
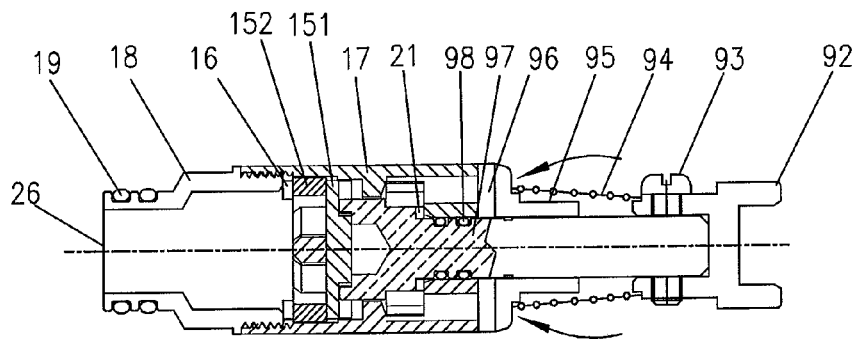
FIG. 2 is a cross-sectional view of the assembled trim when the valve is closed.

As shown in FIG. 2, the expanded spring 94 creates a leak-tight connection between the washer 96 and the sleeve 17 when no fluid or insufficient fluid flows from the coupling member 18. Also, the opposite recesses 1510 of the rotational member 151 do not align with the through holes 1520 of the fixed member 152. As a result, a reverse flow is blocked (i.e., the outlet 27 being blocked).

Figure 3:
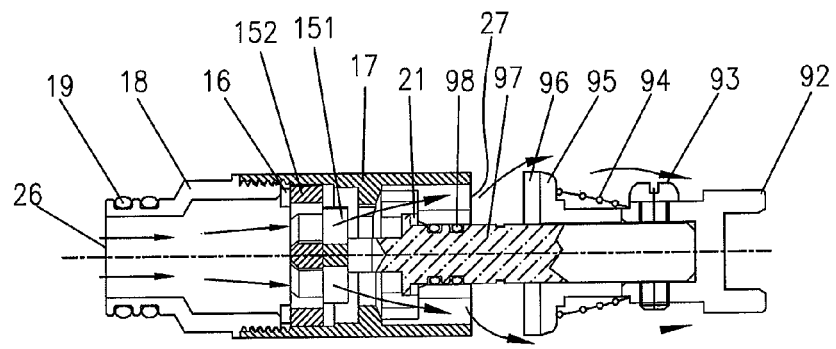
FIG. 3 is a view similar to FIG. 2 where the valve is open.
Figure 4:
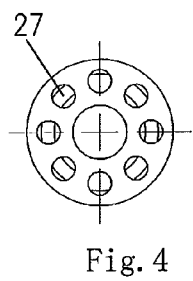
FIG. 4 is one end view of the sleeve.
Figure 6:
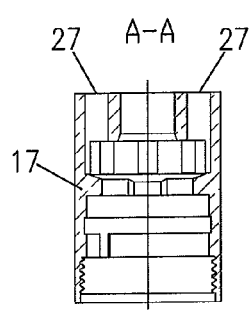
FIG. 6 is a sectional view taken along lines A-A of FIG. 5.
Figure 5:
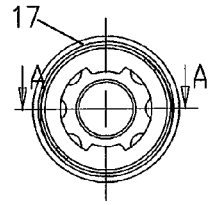
FIG. 5 is the other end view of the sleeve.

As shown in FIG. 3, in response to fluid having a sufficient pressure flows through the coupling member 18, the strong fluid can clockwise rotate the rotational member 151 about 90-degree and thus the stem 97 to align the through holes of the fixed member 152 with the recesses of the rotational member 151. Thus, the fluid path through sleeve 17 is open. Further, the strong fluid can push the washer 96 away from the sleeve 17 by compressing the spring 94. As a result, the fluid flows out of the outlet 27. To the contrary, in response to a weak fluid flow or no fluid flow, the rotational member 151 counterclockwise rotates about 90-degree and also the stem 97 to misalign the through holes 1520 of the fixed member 152 with the recesses 1510 of the rotational member 151. Thus, the fluid path through sleeve 17 is closed and the spring 94 is expanded to push the washer 96 against the other end of the sleeve 17. As a result, the outlet 27 is blocked.

Advantageously, the stem 97 is disposed in both the sleeve 17 and the closing member 95 when the valve is closed. Further, a distance between the disengaged closing member 95 and the sleeve 17 is equal to a length of the spring 94 of FIG. 2 minus a length of the spring 94 of FIG. 3. Such short distance ensures a reduced probability of being stuck. Further, the sliding of the closing member 95 on the stem 97 during opening or closing of the valve can remove fouling formed on the stem 97. Thus, operation of the valve is more reliable and has a prolonged useful life. These are great improvements of the invention comparing with the prior art.

Figure 7:
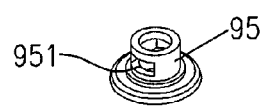
FIG. 7 is a perspective view of a second preferred embodiment of the closing member according to the invention.

Referring to FIG. 7, a second preferred embodiment the closing member 95 of the trim of the check valve in accordance with the invention is shown. The characteristics of the second embodiment are detailed below. The closing member 95 comprises a peripheral opening 951 for allowing scraped fouling to flow with fluid out of the closing member 95 to discharge.

Figure 8:
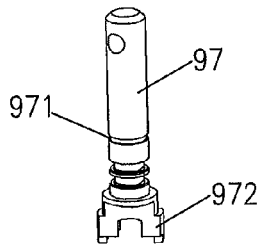
FIG. 8 is a perspective view of a third preferred embodiment of the stem according to the invention.

Referring to FIG. 8, a third preferred embodiment of the stem 97 the trim of the check valve in accordance with the invention is shown. The characteristics of the second embodiment are detailed below. The stem 97 comprises an intermediate perimetric opening 971 for allowing scraped fouling to flow with fluid out of the stem 97 to discharge.

Alternatively, a combination of the second preferred embodiment (i.e., the peripheral opening 951 on the closing member 95) and the third preferred embodiment (i.e., the perimetric opening 971 on the stem 97) is provided for increasing the fouling removal function.

In a fourth preferred embodiment of the invention, a plurality of elongated ribs are formed on an inner surface of the closing member 95. The ribs can scrap fouling on the stem 97 during the valve is open or closed. The scraped fouling is eventually removed out of the closing member 95 to discharge.

In a fifth preferred embodiment of the invention, a plurality of elongated ridges are formed on an outer surface of the stem 97 disposed in the closing member 95. The ridges can scrap fouling on the stem 97 during the valve is open or closed. The scraped fouling is eventually removed out of the closing member 95 to discharge.

Alternatively, a combination of the fourth preferred embodiment (i.e., the ribs on the closing member 95) and the fifth preferred embodiment (i.e., the ridges on the stem 97) is provided for increasing the fouling removal function.

While the invention has been described in terms of preferred embodiments, those skilled in the art will recognize that the invention can be practiced with modifications within the spirit and scope of the appended claims.

What is claimed is:

1. A trim of a check valve comprising:
   a stem;
   a fixed member including two opposite through holes;
   a rotational member secured to a first end of the stem and including two opposite recesses, the rotational member being coaxially with the fixed member and capable of turning about the fixed member;
   a hollow coupling member including an inlet at a first end;
   a sleeve having a first end releasably secured to a second end of the coupling member wherein the sleeve includes an outlet at a second end and both the fixed member and the rotational member are disposed in a position proximate to the first end of the sleeve;
   a closing member moveably disposed at the second end of the sleeve;
   a connector releasably secured to a second end of the stem; and
   a biasing member biased between the closing member and the connector;
   wherein the stem is disposed in the sleeve, the closing member, and the connector;
   wherein the outlet is blocked by the closing member either when there is no fluid flow or when a pressure differential between pressure at the inlet and pressure at the outlet is less than a predetermined value; and
   wherein in response to the pressure differential greater than the predetermined value the rotational member is turned in a first direction by a fluid flowing through the inlet to align the through holes of the fixed member with the recesses of the rotational member to allow the fluid to further flow through a space between the sleeve and the stem to push the closing member away from the sleeve with the biasing member being compressed, thereby flowing the fluid out of the outlet.

2. The trim of a check valve of claim 1, further comprising a secured to an end of the closing member and urged against the second end of the sleeve for blocking the outlet.

3. The trim of a check valve of claim 1, wherein the closing member comprises a peripheral opening for discharging fouling.

4. The trim of a check valve of claim 1, wherein the stem comprises a perimetric opening for discharging fouling.

5. The trim of a check valve of claim 1, wherein the biasing member has a portion put on the closing member.

6. The trim of a check valve of claim 5, wherein the outlet is in proximity to the closing member.

7. The trim of a check valve of claim 6, wherein the coupling member is threadedly secured to the sleeve, the inlet is disposed at the first end of the coupling member, and the outlet is disposed at the second end of the sleeve.

8. The trim of a check valve of claim 7, wherein the outlet is a multiple outlet arranged along an edge.

9. The trim of a check valve of claim 8, wherein the stem is partially disposed in the sleeve and extends out of the second end of the sleeve to pass through the closing member into the connector.

10. The trim of a check valve of claim 9, wherein in response to a weak fluid flow or no fluid flow, the rotational member is turned in a second direction opposing the second direction to misalign the through holes of the fixed member with the recesses of the rotational member, thereby blocking fluid from flowing through the through holes of the fixed member and the recesses of the rotational member.

* * * * *